(12) United States Patent
Roberts, Jr.

(10) Patent No.: US 8,955,224 B2
(45) Date of Patent: Feb. 17, 2015

(54) FLUID BEARINGS WITH ADJUSTABLE FRICTIONAL LOAD CHARACTERISTICS

(75) Inventor: Charles E. Roberts, Jr., Helotes, TX (US)

(73) Assignee: Southwest Research Institute, San Antonio, TX (US)

(*) Notice: Subject to any disclaimer, the term of this patent is extended or adjusted under 35 U.S.C. 154(b) by 634 days.

(21) Appl. No.: 13/184,097

(22) Filed: Jul. 15, 2011

(65) Prior Publication Data

US 2013/0016931 A1 Jan. 17, 2013

(51) Int. Cl.
*B23P 17/00* (2006.01)

(52) U.S. Cl.
USPC ............... 29/898.09; 29/898.08; 29/898.02; 29/898.1; 384/100

(58) Field of Classification Search
USPC ............... 29/898.08, 898.09, 898.02, 898.07, 29/898.1; 384/100, 101, 107, 114
See application file for complete search history.

(56) References Cited

U.S. PATENT DOCUMENTS

| | | |
|---|---|---|
| 3,708,215 A | 1/1973 | Wilcock et al. |
| 4,175,799 A | 11/1979 | Davis et al. |
| 4,243,274 A | 1/1981 | Greene et al. |
| 4,268,094 A | 5/1981 | Greene et al. |
| 5,455,778 A | 10/1995 | Ide et al. |
| 5,459,674 A | 10/1995 | Ide et al. |
| 5,513,917 A | 5/1996 | Ide et al. |
| 5,743,654 A | 4/1998 | Ide et al. |
| 6,460,635 B1 | 10/2002 | Kalsi et al. |
| 6,502,989 B1 | 1/2003 | Takeuchi et al. |
| 6,766,697 B1 | 7/2004 | Perez et al. |
| 2006/0251859 A1 | 11/2006 | D'Urso |
| 2007/0245563 A1* | 10/2007 | Smith .................. 29/898.08 |
| 2013/0114919 A1* | 5/2013 | Roberts, Jr. ............... 384/100 |
| 2014/0026843 A1 | 1/2014 | Florea et al. |

FOREIGN PATENT DOCUMENTS

WO 94/00819 1/1994

* cited by examiner

*Primary Examiner* — Ryan J Walters
(74) *Attorney, Agent, or Firm* — Grossman, Tucker et al (57) ABSTRACT

An aspect of the present disclosure relates to a fluid bearing and a method of adjusting the load carrying capacity of a fluid bearing. The fluid bearing may include a bore defined in the fluid bearing and a rotatable bearing including a rotatable bearing surface. Lubricating fluid in the bore may be contacted with at least a portion of the rotatable bearing surface, wherein an effective bearing surface area is provided where the lubricating fluid contacts the rotatable bearing surface. The effective bearing surface area may be altered by either increasing or reducing the area of the rotatable bearing surface which is contacted by the lubricating fluid.

10 Claims, 6 Drawing Sheets

FLUID BEARINGS WITH ADJUSTABLE FRICTIONAL LOAD CHARACTERISTICS

FIELD OF THE INVENTION

The present disclosure relates generally to fluid bearings and, in particular, to fluid bearings with adjustable frictional load characteristics.

BACKGROUND

Fluid bearings may be designed to provide hydrodynamic load bearing capability across a range of operating conditions. However, the wetted-load carrying area of the bearing, for example, may be of generally fixed geometry. Because the load-carrying capacity of the bearing may be proportional to the bearing surface area, the bearing may effectively be over-designed for certain operating conditions where the instantaneous load bearing capacity may be above the actual load at the time. Consequently, at operating conditions where the bearing capacity may be higher than the actual load, the carrying area and, therefore, viscous drag of the bearing may be higher than that which would occur for a bearing designed to accommodate the actual load.

SUMMARY OF THE INVENTION

An aspect of the present disclosure relates to a method of adjusting the load carrying capacity of a fluid bearing including a bore defined in the fluid bearing and a rotatable bearing including a rotatable bearing surface. The method may include contacting a lubricating fluid in the bore with at least a portion of the rotatable bearing surface, wherein an effective bearing surface area is provided where the lubricating fluid contacts the rotatable bearing surface. The method may also include altering the effective bearing surface area, by either increasing or reducing the area of the rotatable bearing surface which is contacted by the lubricating fluid.

Another aspect of the present disclosure relates to a fluid bearing having an adjustable effective surface area. The fluid bearing may include a bore defined in the fluid bearing, a rotatable bearing including a rotatable bearing surface, wherein at least a portion of the rotatable bearing surface is positioned in the bore, lubricating fluid provided within the bore, and an adjustable effective bearing surface area defined by the area of the rotatable bearing surface positioned in the bore contacted by the lubricating fluid.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As noted above, fluid bearings may be designed to provide hydrodynamic load bearing capability across a range of operating conditions. The present disclosure relates generally to fluid bearings and, in particular, to fluid bearings with adjustable frictional load characteristics. The bearing load may be supported by lubricating fluid, which may contact a rotatable bearing surface or journal within a bore or sleeve defined in the fluid bearing.

Fluid bearings may generally include, for example, hydrostatic bearings or hydrodynamic bearings. Hydrostatic fluid bearings may be understood as fluid bearings wherein the fluid may be pressurized and pumped into the bearing through an inlet. Hydrodynamic bearings may be understood as fluid bearings wherein the bearing rotation itself may draw the fluid on to the inner surface of the bearing, forming a lubricating wedge of film under or around the rotatable bearing surface. Hydrodynamic bearings may also utilize a pump or a secondary bearing to aid in start up, shut down or both.

A number of factors may affect the performance of a fluid bearing. The diameter and length of the rotatable bearing (or journal), the gap between the bearing surface and the bore (or sleeve) in which the bearing rotates in, surface roughness and lubricating fluid properties will all affect the load bearing capacity of a fluid bearing. The performance of the bearing may also be affected by a number of factors such as viscous drag. Without being limited to any particular theory, the viscous drag of a fluid bearing may be generally stated as follows.

$$DragForce = A\vartheta \frac{\delta v}{\delta y}$$

In the above formula, the drag force is proportional to the effective bearing area, A, the fluid viscosity θ, and the spatial rate of change of the velocity in the bearing gap, δv/δy. Furthermore, the load-carrying capacity of the bearing, such as the ability to maintain a minimum oil-film thickness, i.e., the ability to operate without surface-to-surface contact, may be understood as a function of the effective bearing area. Fluid bearings may be designed to operate at a range of loads up to a maximum load, wherein the above parameters are set, i.e., length, diameter, surface area, etc. based on the maximum bearing capacity, regardless of the instantaneous load (i.e., the actual load on the bearing). However, there may be times where the instantaneous load may be less than the maximum bearing capacity. In such situations, losses, such as viscous drag, may be greater than that experienced by a fluid bearing that is specifically designed for the instantaneous load. Provided herein are fluid bearings and methods for reducing the viscous drag flow of fluid bearings when the instantaneous load may be less than the maximum bearing capacity.

Figure 1:
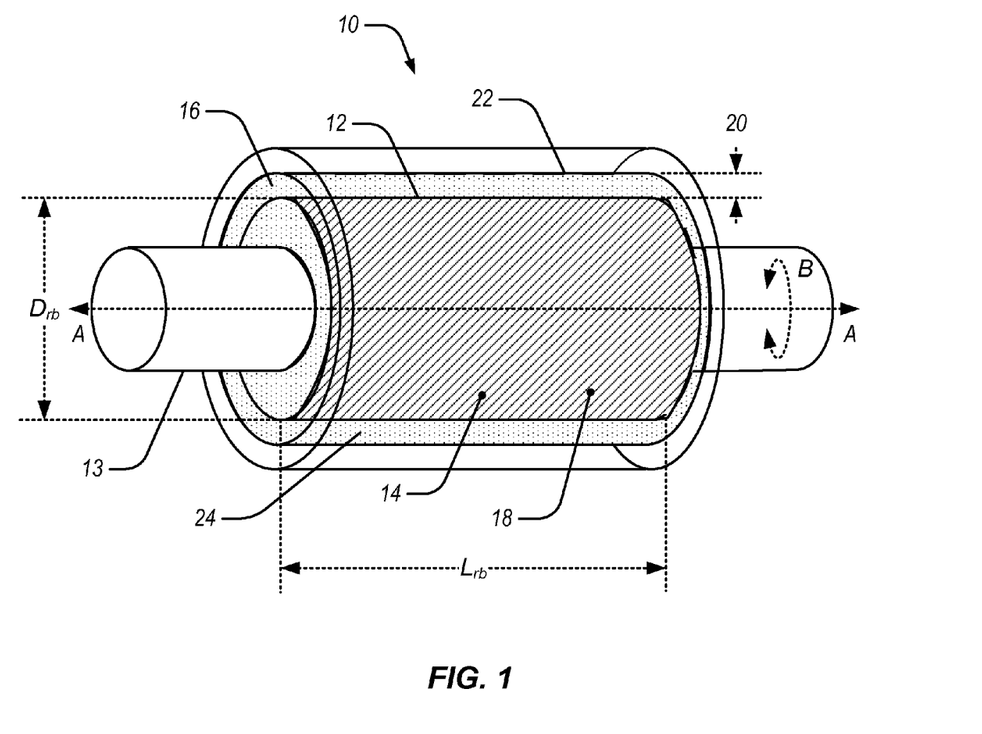
FIG. 1 illustrates a front perspective view of an example of a fluid bearing.

FIG. 1 illustrates an embodiment of a fluid bearing 10, which includes a rotatable bearing 12 provided on a shaft 13. The rotatable bearing 12 includes a surface 14, positioned within a bore 16, wherein the effective bearing area 18 as shown is the area of the rotatable bearing surface 14 located within the bore 16 and contacted by the lubricating fluid 24. As illustrated, the effective bearing area 18 is the shaded area with parallel lines (in this example the effective bearing area 18 is substantially equivalent to the entire surface 14 of the rotating bearing 12 located within the fluid bearing 10). The rotatable bearing 12 may be formed integrally with the shaft 13 or may be coupled to the shaft 13. Furthermore, as illustrated, the rotatable bearing 12 and bore 16 may be generally cylindrical. In other embodiments, the rotatable bearing 12 and bore 16 may be in the form of frustro-conical, hemispherical, spherical or other shapes. A bearing gap 20 may be provided between the wall 22 of the bore 16 and the rotatable bearing 12.

Figure 4:
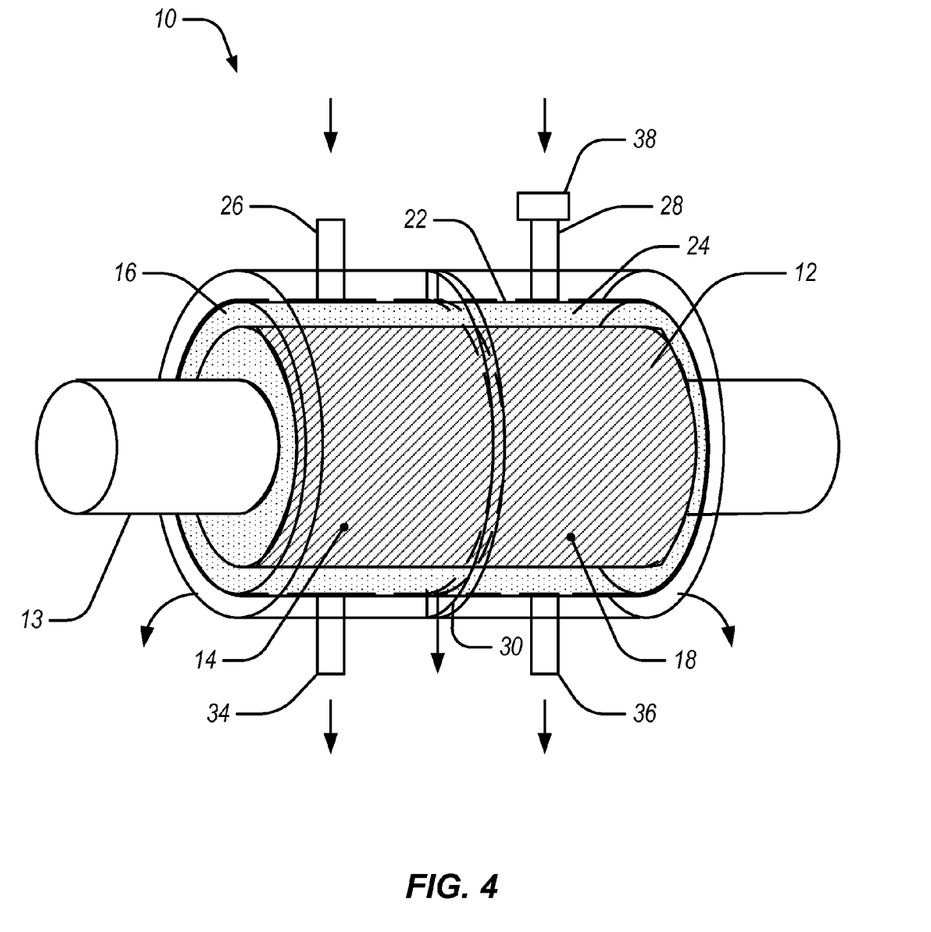
FIG. 4 illustrates a front perspective view of another embodiment of a fluid bearing including lubricating fluid partition outlet positioned between two laterally spaced lubricating fluid inlets.
Figure 5:
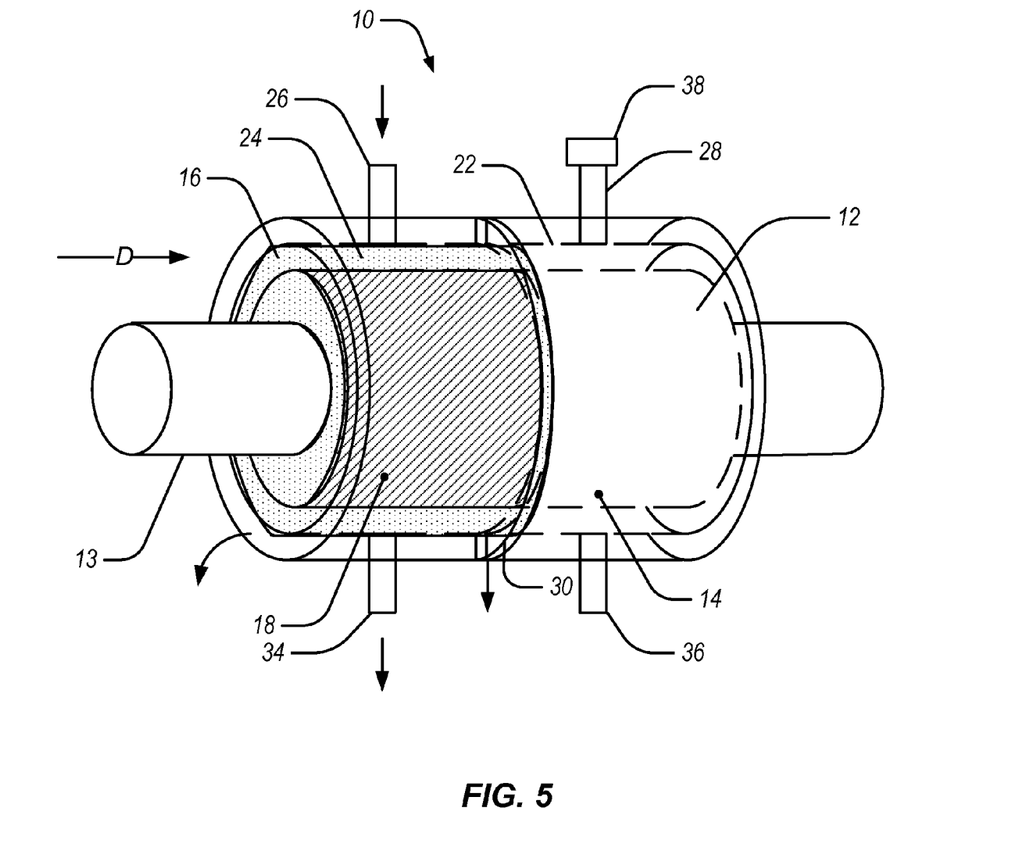
FIG. 5 illustrates a front perspective view of the embodiment of the fluid bearing illustrated in FIG. 4, wherein the flow into one of the lubricating fluid inlets is restricted, reducing the effective bearing surface area.

As alluded to above, lubricating fluid 24 may surround the rotatable bearing 12 positioned within the bore 16. The lubricating fluid may include preferably include a liquid, such as water or oil. In some embodiments, the lubricating fluid may be relatively viscous, wherein the lubricating fluid viscosity may be in the range of 50 cP or greater, such as in the range of 50 cP to 10,000 cP, including all values and ranges therein, such as 100 cP to 1,000 cP, 1,000 cP to 3,000 cP, etc. The lubricating fluid may be supplied to the bearing continuously and/or intermittently during operation or once upon bearing assembly or during bearing maintenance. In one embodiment, (as illustrated in FIGS. 4 and 5 discussed further herein) inlets and outlets may be provided in fluid communication with the bore. At least one inlet and at least one outlet may be provided or a plurality of inlets and outlets may be provided. The lubricating fluid in the fluid bearing may be fully-flooded, where the lubricant may fill space in the bore between the bore wall and the rotatable bearing; or partially starved, where the lubricant may fill less than all of the space in the bore between the bore wall and the rotatable bearing. Where the lubricating fluid may be fully-flooded, the lubricating fluid may, in some cases, be under pressure, wherein the pressure may be developed by a pump. In some embodiments, the lubricating fluid may be supplied from a reservoir (not illustrated), which is in fluid communication with the inlets and/or outlets and passed through the bearing bore 16 continuously or intermittently.

Referring again to FIG. 1, the rotating bearing 12 may generally rotate around axis A-A in the general direction of arrow B. Axis A-A may generally be perpendicular to the opening of the bore 16. In some embodiments, axis A-A may also be generally parallel a central axis defined by the bore 16, which as illustrated may be coincident with axis A-A. It may be appreciated, however, that the rotating bearing 12 may not necessarily rotate concentric to the central axis of the bore 16, but may rotate in an eccentric manner around the central axis of the bore 16. The area of the rotating bearing surface 14 may generally be defined by a length $L_{rb}$ and a circumference $C_{rb}$, which may be calculated from the rotating bearing diameter $D_{rb}$.

Figure 2:
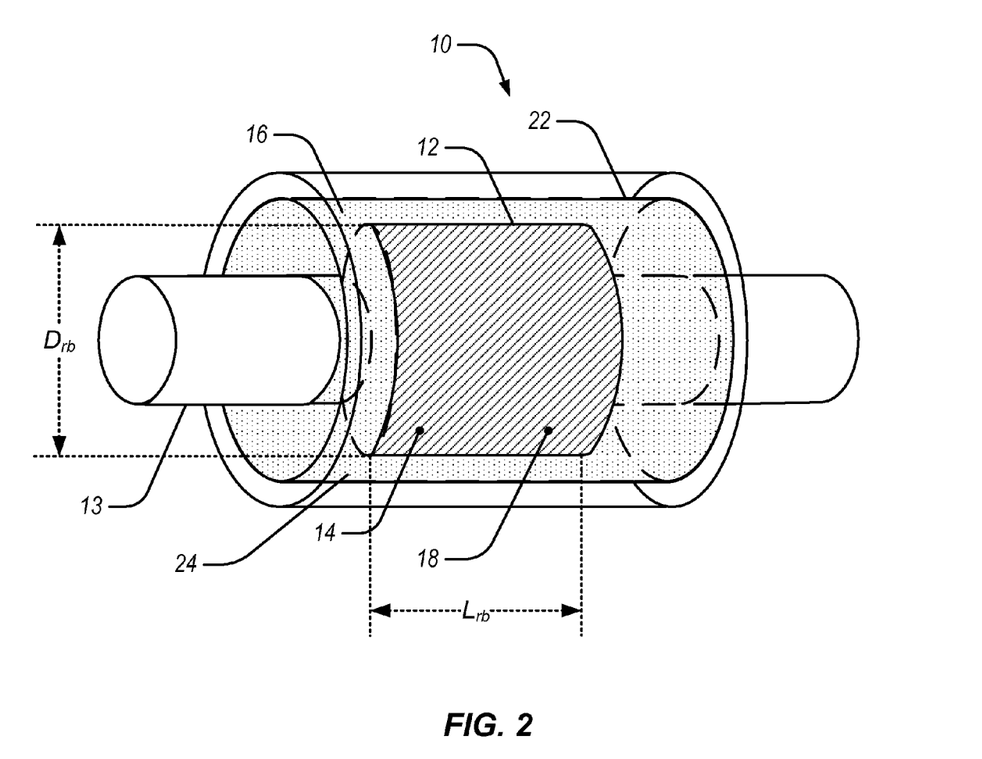
FIG. 2 illustrates a front perspective view of the fluid bearing of FIG. 1, wherein the rotatable bearing surface area is reduced, reducing the effective bearing surface area.

As noted above, by altering the size of the effective bearing surface area when operating at capacities less than the maximum bearing capacity, the drag force may be reduced. The effective bearing surface area 16 may generally be reduced by reducing the area of the rotatable bearing surface 14 that contacts the lubricating fluid in the bore 16 of the fluid bearing 10. FIG. 2 illustrates an embodiment wherein the length $L_{rb}$ of the rotating bearing 12 may be reduced, reducing the area of the rotating bearing surface 14. This may, therefore, reduce the effective bearing surface area 18 of the fluid bearing 10. The length $L_{rb}$ of the rotating bearing 12 may be reduced from a first length $L_{rb1}$ providing a maximum bearing capacity to a second length $L_{rb2}$ by a factor of x selected for the instantaneous load of the fluid bearing calculated by methods known by a person of ordinary skill in the art, where $L_{rb2}=xL_{rb1}$, where x is in the range of 0.1 to 0.99, including all values and ranges therein, such as 0.25 to 0.75, etc.

In the embodiment of FIG. 2, the effective bearing surface area 18 and the area of the rotatable bearing surface 14 are reduced relative to the length of the bore and as shown, are the same. In this embodiment, the rotatable bearing 12 may be reduced by forming the rotating bearing 12 out of, for example, a sliding or telescopic sleeve, which may be mechanically or hydraulically contracted or expanded over the shaft 13. It may be appreciated that the size of the effective bearing surface area may be increased by increasing the length $L_{rb}$ of the rotating bearing 12 up to a maximum length selected for the maximum bearing capacity.

Figure 3:
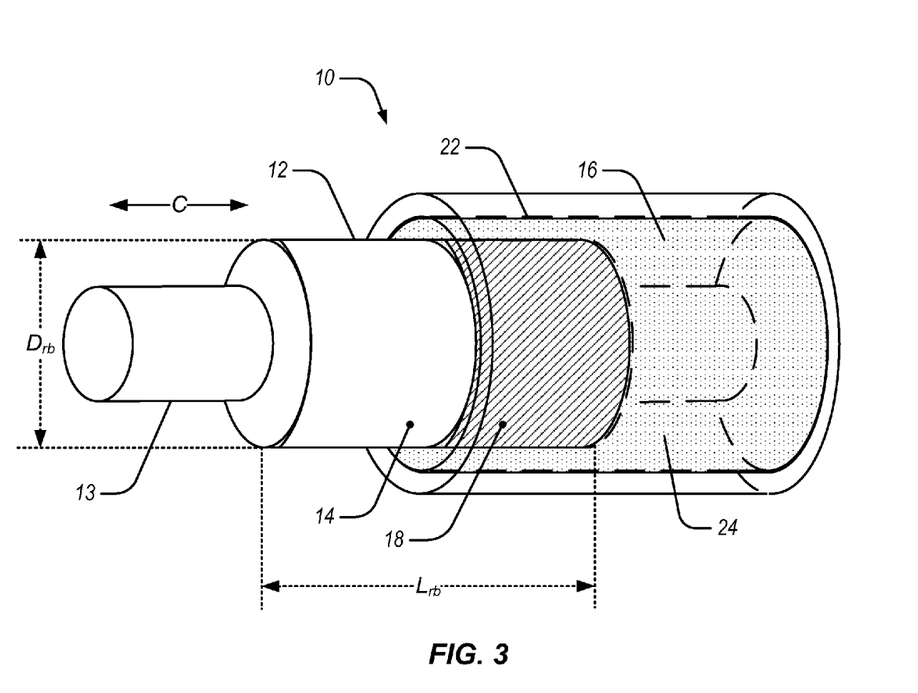
FIG. 3 illustrates a front perspective view of an example of a fluid bearing, wherein the rotatable bearing surface is laterally displaced relative to the bore of the bearing, reducing the effective surface bearing area.

In another embodiment, illustrated in FIG. 3, the effective bearing surface area 18 may be reduced by adjusting the area of the rotatable bearing surface 14 positioned in the bore 16. This may be accomplished by removing a portion of the rotatable bearing 12 from within the bore 16. The rotatable bearing 12 may be displaced laterally from the bore 16, in direction of arrow C either by moving the rotatable bearing 12 or the wall 22 and bore 16. The displacement may be accomplished mechanically, electrically, magnetically, hydraulically, or combinations thereof. In reducing the area of the rotatable bearing surface 14 in the bore 16, less area of the rotatable bearing surface 14 may contact the lubricating fluid 24 within the bore 16 reducing the viscous drag.

In such an embodiment, the effective bearing surface area 18 may be less than the area of the rotatable bearing surface 14 and the relationship between the effective bearing surface area 18 and the rotatable bearing surface area 14 may be represented by the following formula, $A_e=yA_{rb}$, wherein $A_e$ is the effective bearing surface area, $A_{rb}$ is the rotatable bearing surface area (a fixed value) and y is in the range of 0.1 to 0.99, including all values and ranges therein such as from 0.25 to 0.75, etc.

The effective bearing surface area may also be understood as capable of being reduced from a first effective bearing surface area $A_{e1}$ exhibited when the fluid bearing is operating at maximum capacity to a second effective bearing surface area $A_{e2}$ selected for the instantaneous load of the bearing by a factor of z, wherein $A_{e2}=zA_{e1}$ and z is in the range of 0.1 to 0.99, including all values and ranges therein, such as from 0.25 to 0.75, etc. It may further be appreciated that the effective bearing surface area may be increased by increasing the portion of the rotatable bearing 12 and the area of the rotatable bearing surface 14 in the bore 16, by laterally displacing the rotatable bearing 12 back into the bore 16.

In other embodiments, the effective bearing surface area 18 may also be altered by adjusting the flow of the lubricating fluid over the rotatable bearing surface 14 altering the area of the rotatable bearing surface 14 that is contacted by the lubricating fluid. The flow may be adjusted by adjusting the volumetric or flow rate of the lubricating fluid passing through the inlets and outlets of the bearing. Increasing the area of the rotatable bearing surface that is contacted by the lubricating fluid may increase the effective bearing surface area and decreasing the area of the rotatable bearing surface that is contacted by the lubricating fluid may decrease the effective bearing surface area.

FIGS. 4 and 5 illustrate an embodiment wherein the effective bearing surface area 18 may be adjusted by adjusting flow through the lubricating fluid inlet ports 26, 28. Generally, the fluid bearing 10 may include one or more lubricating fluid inlet ports 26, 28 and one or more lubricating fluid outlet ports 30, 34, 36. In this embodiment, the fluid bearing 10 includes at least two lubricating fluid inlet ports 26, 28 and at least one partition lubricating fluid outlet port 30. Additional lubricating fluid outlet ports 34, 36 may be present as well.

The two lubricating fluid inlet ports 26, 28 may be spaced laterally along the wall 22 of the bore 16. In addition, as illustrated the lubricating fluid inlet ports 26, 28 may be positioned at generally the same location around the circumference of the wall 22 as illustrated or the position of lubricating fluid inlet ports 26, 28 may be offset or staggered around the circumference of the wall 22, such that the ports may be located from 1° to 359° from each other when viewing the bearing from the side in the direction of arrow D as illustrated in FIG. 5.

Furthermore, when a partition lubricating fluid outlet port 30 is present, the partition outlet port 30 may be positioned between the lubricating fluid inlet ports 26, 28. As illustrated, the partition outlet 30 may be preferably positioned halfway between the adjacent lubricating fluid inlet ports 26, 28; however, it may be appreciated that the partition outlet 30 may be positioned at different spacings between the fluid inlet ports as well, such as a quarter of the way from either of the adjacent inlet ports, a third of the way from either of the adjacent inlet ports, etc. In this embodiment, the partition outlet port 30 may be in the shape of a groove that passes through the wall 22. Other geometries may also be contemplated for the partition outlet port 30, such as a single through hole or a dashed through hole configuration, wherein the through holes may be circular, square, rectangular, etc.

To control or alter the effective bearing surface area, flow of the lubricating fluid through one of the inlet ports, such as port 28, may be reduced or eliminated, using, for example, a valve 38, as illustrated in FIG. 5. The valve 38 may be generally understood as a device configured to reduce or eliminate the flow of the lubricating fluid. Upon activating valve 38, at least a portion of or all of the lubricating fluid may drain out of the bore through partition outlet port 30 before flowing down the length of the bore in the direction illustrated by arrow D. In such a manner, a portion of the area of the rotating bearing surface 14 may not be substantially contacted by the lubricating fluid 24, reducing the effective bearing surface area 18. Accordingly, the partition outlet port 30 may act as a partition or trench. The outlets may provide additional drainage, which may further reduce the ability of the lubricating fluid to flow along the length of the bore and/or contact the rotatable bearing surface.

Figure 6:
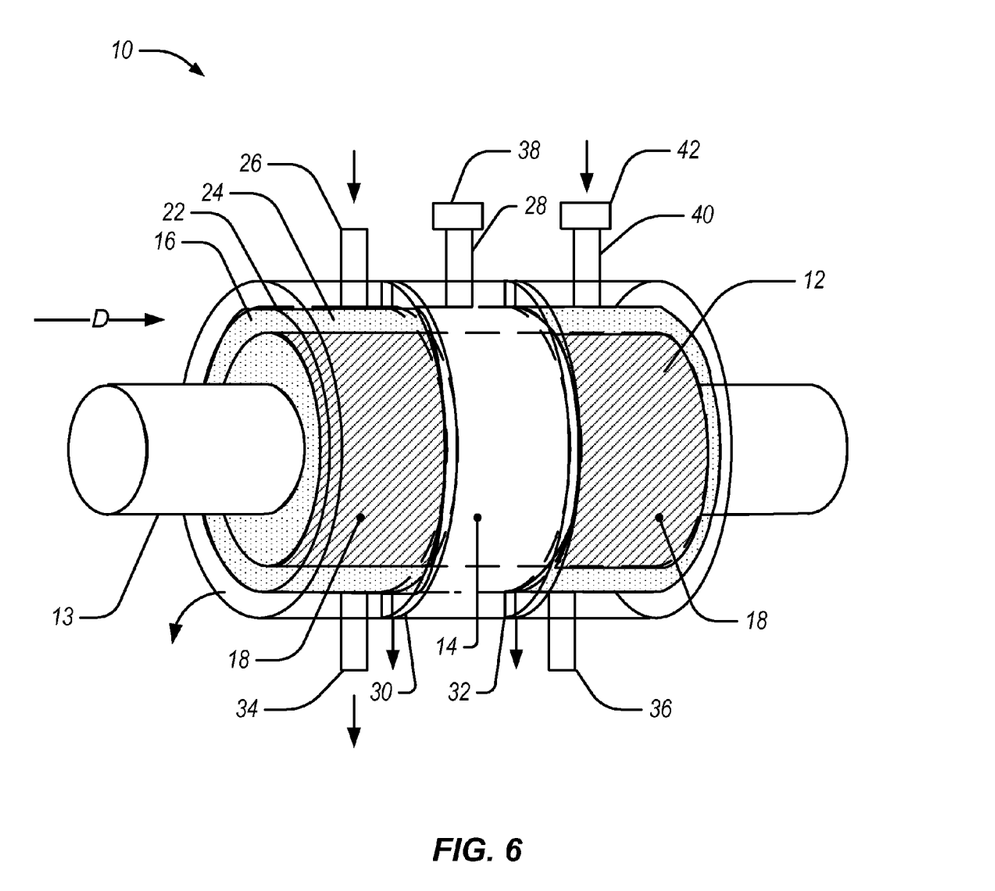
FIG. 6 illustrates a front perspective view of an embodiment of a fluid bearing, wherein the flow into one of the lubricating fluid inlets is restricted, reducing the effective bearing surface area.

In other embodiments, such as illustrated in FIG. 6, additional fluid inlet ports, such as inlet port 40 may be present spaced laterally from an adjacent lubricating fluid inlet port 28. In such a manner, an additional partition outlet 32 may be provided between inlet port 40 and the adjacent inlet port 28. The additional inlet port may also include a valve 42, which may be operated independently of the other inlet valves present. The additional partition outlet 32 may provide additional partitions or trenches along the length of the rotating bearing surface 14 allowing for increased control in regulating the effective bearing surface area 18. As illustrated, two-thirds of the rotating bearing surface area 14 is contacted with lubricating fluid 24. Thus, the effective bearing surface area is two-thirds 18 of the rotating bearing surface area 14. In addition, as illustrated, valve 42 may be open and lubricating fluid 24 may be supplied through inlet ports 26 and 40. In other embodiments, other valve combinations may be open or closed. For example, valves 38 and 42 or valves 26 and 38 may be closed and only one-third of the rotating bearing surface area 14 may be contacted with lubricating fluid 24. In yet other embodiments, flow of lubricating fluid through the lubricating fluid outlets, including the partition outlets or additional outlets, may be restricted or eliminated to further alter the lubricating fluid flow.

It may be appreciated that the fluid bearings and methods described herein may be utilized in a number of applications. It is contemplated, for example, that the fluid bearings may be utilized in motors, such as in hard disk drives or motor vehicles. In particular, it is contemplated that the bearings and methods described herein may be utilized in conjunction with cam shafts, crankshafts, superchargers, etc.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of adjusting the load carrying capacity of a fluid bearing including a bore defined in said fluid bearing and a rotatable bearing including a rotatable bearing surface, comprising:
   providing a fluid bearing including a bore defined in said fluid bearing wherein said bore has a wall, a rotatable bearing positioned within said bore wherein said rotatable bearing includes a surface, and a bearing gap between the wall of the bore and the rotatable bearing;
   contacting a lubricating fluid in said bore with at least a portion of said rotatable bearing surface, wherein an effective bearing surface area is provided where said lubricating fluid contacts and surrounds said rotatable bearing surface;
   rotating said rotatable bearing about an axis; and
   altering the effective bearing surface area, by either increasing or reducing the area of the rotatable bearing surface which is contacted by said lubricating fluid.

2. The method of claim 1, wherein rotatable bearing surface area is defined by a length and circumference and altering said effective bearing surface area comprises altering the length of said rotatable bearing surface located in said bore.

3. The method of claim 1, wherein said rotatable bearing is laterally displaceable relative to said bore, wherein the effective bearing surface area is defined by the area of said rotatable bearing surface located in said bore, and altering said effective bearing surface area comprises laterally displacing said rotatable bearing to increase or decrease the area of said rotatable bearing surface located in said bore.

4. The method of claim 3, wherein said effective bearing surface area is reduced by decreasing the area of said rotatable bearing surface located in said bore.

5. The method of claim 3, wherein said effective bearing surface area is increased by increasing the area of said rotatable bearing surface located in said bore.

6. The method of claim 1, wherein said fluid bearing includes at least two inlets laterally spaced along the length of said bore for providing lubricating fluid to said bore and wherein altering said effective bearing surface area comprises adjusting the flow of lubricating fluid through said inlets.

7. The method of claim 6, wherein adjusting the flow of lubricating fluid comprises restricting the flow of lubricant through one of said inlets and reducing the portion of the rotatable bearing surface which is contacted by said lubricating fluid thereby reducing the effective bearing surface area.

8. The method of claim 7, wherein said fluid bearing includes at least one partition outlet laterally positioned between said inlets along the length of said bore for draining said lubricating fluid, wherein said partition outlet restricts said lubricating fluid from flowing along the length of said bore and reduces the portion of the rotatable bearing surface which is contacted by said lubricating fluid thereby reducing the effective bearing surface.

9. The method of claim 1, wherein said fluid bearing further comprising at least two lubricating fluid inlets and a lubricating fluid partition outlet, wherein said effective bearing surface area is altered by restricting the volume of lubricating fluid provided through said lubricating fluid inlets and released from said lubricating fluid partition outlet.

10. The method of claim 1, wherein said lubricating fluid is pressurized in said bore.

* * * * *